(12) United States Patent
Lin et al.

(10) Patent No.: US 9,695,323 B2
(45) Date of Patent: Jul. 4, 2017

(54) UV CURABLE SOLVENTLESS ANTIMICROBIAL COMPOSITIONS

(71) Applicant: Becton, Dickinson and Company, Franklin Lakes, NJ (US)

(72) Inventors: Janice Lin, Sandy, UT (US); Yiping Ma, Layton, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 176 days.

(21) Appl. No.: 13/766,517

(22) Filed: Feb. 13, 2013

(65) Prior Publication Data

US 2014/0228466 A1 Aug. 14, 2014

(51) Int. Cl.
*C09D 5/14* (2006.01)
*C09D 4/00* (2006.01)

(52) U.S. Cl.
CPC ........... *C09D 5/14* (2013.01); *C09D 4/00* (2013.01)

(58) Field of Classification Search
CPC .................................... C09D 5/14; C09D 4/00
See application file for complete search history.

(56) References Cited

U.S. PATENT DOCUMENTS

| | | |
|---|---|---|
| 3,223,629 A | 12/1965 | Loeffler |
| 3,695,921 A | 10/1972 | Shepherd et al. |
| 3,986,508 A | 10/1976 | Barrington |
| 4,170,996 A | 10/1979 | Wu |
| 4,334,551 A | 6/1982 | Pfister |
| 4,339,336 A | 7/1982 | Hammond et al. |
| 4,387,879 A | 6/1983 | Tauschinski |
| 4,449,693 A | 5/1984 | Gereg |
| 4,512,766 A | 4/1985 | Vailancourt |
| 4,584,192 A | 4/1986 | Dell et al. |
| 4,592,920 A | 6/1986 | Murtfeldt |
| 4,603,152 A | 7/1986 | Laurin et al. |
| 4,629,743 A | 12/1986 | Hong |
| 4,629,746 A | 12/1986 | Michl et al. |
| 4,642,126 A | 2/1987 | Zador et al. |
| 4,676,782 A | 6/1987 | Yamamoto et al. |
| 4,677,143 A | 6/1987 | Laurin et al. |
| 4,716,032 A | 12/1987 | Westfall et al. |
| 4,758,225 A | 7/1988 | Cox et al. |
| 4,798,594 A | 1/1989 | Hillstead |
| 4,842,591 A | 6/1989 | Luther |
| 4,874,377 A | 10/1989 | Newgard et al. |
| 4,895,566 A | 1/1990 | Lee |
| 4,897,427 A | 1/1990 | Barnavon et al. |
| 4,915,934 A | 4/1990 | Tomlinson |
| 4,917,668 A | 4/1990 | Haindl |
| 4,925,668 A | 5/1990 | Khan et al. |
| 4,933,178 A | 6/1990 | Capelli |
| 4,935,010 A | 6/1990 | Cox et al. |
| 4,950,257 A | 8/1990 | Hibbs et al. |
| 4,955,890 A | 9/1990 | Yamamoto et al. |
| 4,985,399 A | 1/1991 | Matsuda et al. |
| 4,990,357 A | 2/1991 | Karakelle et al. |
| 5,019,096 A | 5/1991 | Fox, Jr. et al. |
| 5,023,082 A | 6/1991 | Friedman et al. |
| 5,030,665 A | 7/1991 | Lee et al. |
| 5,041,097 A | 8/1991 | Johnson |
| 5,053,014 A | 10/1991 | Van Heugten |
| 5,062,836 A | 11/1991 | Wendell |
| 5,064,416 A | 11/1991 | Newgard et al. |
| 5,077,352 A | 12/1991 | Elton |
| 5,078,703 A | 1/1992 | Bryant |
| 5,084,023 A | 1/1992 | Lemieux |
| 5,085,645 A | 2/1992 | Purdy et al. |
| 5,098,410 A | 3/1992 | Kerby et al. |
| 5,108,374 A | 4/1992 | Lemieux |
| 5,127,905 A | 7/1992 | Lemieux |
| 5,154,703 A | 10/1992 | Bonaldo |
| 5,156,596 A | 10/1992 | Balbierz et al. |

(Continued)

FOREIGN PATENT DOCUMENTS

| | | |
|---|---|---|
| CA | 1331333 | 8/1994 |
| CA | 2133053 A1 | 3/1995 |

(Continued)

OTHER PUBLICATIONS

Ciba Irgacure 500 data sheet from Ciba Speciality Chemicals. online. retrieved on [Dec. 13, 2015]. retrieved from interent <URL://http://www.conquimica.com/wp-content/uploads/2015/06/ft_irgacure_500.pdf>.*
Anusavice KJ, Zhang N-Z, Shen C. Controlled Release of Chlorhexidine from UDMA-TEGDMA Resin. Journal of dental research. 2006;85(10):950-954.*
"ComfortCoat Hydrophilic Coating," DSM in Medical, http://www.dsm.com/en_US/medical/public/home/pages/product-coating-comfortcoat.jsp, Updated Jan. 11, 2013, Printed Apr. 22, 2013.
"Lubricent—Lubricious Hydrophillic Coatings for Medical Devices," Harland Medical Systems, http://www.harlandmedical.com/index.php/materials/lubricent.html, pp. 1-2, Printed Apr. 22, 2013.

(Continued)

*Primary Examiner* — Sanza McClendon
(74) *Attorney, Agent, or Firm* — Jeanne Lukasavage; Craig Metcalf; Kirton McConkie (57) ABSTRACT

Antimicrobial compositions and methods are disclosed. The antimicrobial compositions are particularly useful in providing antimicrobial capability to a wide-range of medical devices. In one aspect the invention relates a UV curable antimicrobial coating comprising a UV curable composition comprising an oligomer, a momoner, and a photoinitiator which are together capable of forming a UV curable polymer composition. The compositions also include insoluble antimicrobial agents, which may be selected from a wide array of agents. The insoluble antimicrobial agents include a particle size less than 15 μm. Representative insoluble antimicrobial agents include chlorhexidine diacetate, chlorhexidine base, alexidine(dihydrochloride), silver sulfadiazene, silver citrate, triclosan, octenidine(dihydrochloride), and rifampicin.

11 Claims, 4 Drawing Sheets

(56) References Cited

U.S. PATENT DOCUMENTS

| | | | |
|---|---|---|---|
| 5,217,493 | A | 6/1993 | Raad et al. |
| 5,234,410 | A | 8/1993 | Graham et al. |
| 5,242,425 | A | 9/1993 | White et al. |
| 5,290,246 | A | 3/1994 | Yamamoto et al. |
| 5,295,969 | A | 3/1994 | Fischell et al. |
| 5,330,435 | A | 7/1994 | Vaillancourt |
| 5,350,363 | A | 9/1994 | Goode et al. |
| 5,352,205 | A | 10/1994 | Dales et al. |
| 5,357,636 | A | 10/1994 | Dresdner, Jr. et al. |
| 5,366,505 | A | 11/1994 | Farber |
| 5,405,323 | A | 4/1995 | Rogers et al. |
| 5,456,675 | A | 10/1995 | Wolbring et al. |
| 5,456,948 | A | 10/1995 | Mathisen et al. |
| 5,487,728 | A | 1/1996 | Vaillancourt |
| 5,512,199 | A | 4/1996 | Khan et al. |
| 5,520,666 | A | 5/1996 | Choudhury et al. |
| 5,540,661 | A | 7/1996 | Tomisaka et al. |
| 5,547,662 | A | 8/1996 | Khan et al. |
| 5,549,566 | A | 8/1996 | Elias et al. |
| 5,549,577 | A | 8/1996 | Siegel et al. |
| 5,575,769 | A | 11/1996 | Vaillancourt |
| 5,613,663 | A | 3/1997 | Schmidt et al. |
| 5,616,338 | A | 4/1997 | Fox, Jr. et al. |
| 5,620,434 | A | 4/1997 | Brony |
| 5,629,006 | A | 5/1997 | Hoang et al. |
| 5,638,812 | A | 6/1997 | Turner |
| 5,651,772 | A | 7/1997 | Arnett |
| 5,653,695 | A | 8/1997 | Hopkins et al. |
| 5,657,963 | A | 8/1997 | Hinchliffe et al. |
| 5,688,747 | A | 11/1997 | Khan et al. |
| 5,697,915 | A | 12/1997 | Lynn |
| 5,698,229 | A | 12/1997 | Ohsumi et al. |
| 5,712,229 | A | 1/1998 | Hopkins et al. |
| 5,716,406 | A | 2/1998 | Farber |
| 5,738,144 | A | 4/1998 | Rogers |
| 5,749,861 | A | 5/1998 | Guala et al. |
| 5,763,412 | A | 6/1998 | Khan et al. |
| 5,773,487 | A | 6/1998 | Sokol |
| 5,806,831 | A | 9/1998 | Paradis |
| 5,817,069 | A | 10/1998 | Arnett |
| 5,830,196 | A | 11/1998 | Hicks |
| 5,833,674 | A | 11/1998 | Turnbull et al. |
| 5,843,046 | A | 12/1998 | Motisi et al. |
| 5,861,440 | A | 1/1999 | Gohla et al. |
| 5,911,710 | A | 6/1999 | Barry et al. |
| 5,954,698 | A | 9/1999 | Pike |
| 5,967,490 | A | 10/1999 | Pike |
| 6,039,302 | A | 3/2000 | Cote, Sr. et al. |
| 6,046,143 | A | 4/2000 | Khan et al. |
| 6,051,609 | A | 4/2000 | Yu et al. |
| 6,077,244 | A | 6/2000 | Botich et al. |
| 6,117,108 | A | 9/2000 | Woehr et al. |
| 6,120,784 | A | 9/2000 | Snyder, Jr. |
| 6,127,320 | A | 10/2000 | van Ooij et al. |
| 6,165,168 | A | 12/2000 | Russo |
| 6,171,287 | B1 | 1/2001 | Lynn et al. |
| 6,242,526 | B1 | 6/2001 | Siddiqui et al. |
| 6,248,811 | B1 | 6/2001 | Ottersbach et al. |
| 6,273,869 | B1 | 8/2001 | Vaillancourt |
| 6,326,417 | B1 | 12/2001 | Jia |
| 6,337,357 | B1 | 1/2002 | Fukunishi et al. |
| 6,344,218 | B1 | 2/2002 | Dodd et al. |
| 6,353,041 | B1 | 3/2002 | Qian |
| 6,413,539 | B1 | 7/2002 | Shalaby |
| 6,426,373 | B1 * | 7/2002 | Stange ............... A61K 6/083 433/202.1 |
| 6,475,434 | B1 | 11/2002 | Darouiche |
| 6,485,473 | B1 | 11/2002 | Lynn |
| 6,488,942 | B1 | 12/2002 | Ingemann |
| 6,492,445 | B2 | 12/2002 | Siddiqui et al. |
| 6,544,214 | B1 | 4/2003 | Utterberg |
| 6,575,960 | B2 | 6/2003 | Becker et al. |
| 6,576,633 | B1 | 6/2003 | Young et al. |
| 6,579,539 | B2 | 6/2003 | Lawson et al. |
| 6,595,981 | B2 | 7/2003 | Huet |
| 6,699,221 | B2 | 3/2004 | Vaillancourt |
| 6,719,726 | B2 | 4/2004 | Meng et al. |
| 6,719,991 | B2 | 4/2004 | Darouiche et al. |
| 6,723,350 | B2 | 4/2004 | Burrell et al. |
| 6,740,063 | B2 | 5/2004 | Lynn |
| 6,808,161 | B1 | 10/2004 | Hishikawa |
| 6,843,784 | B2 | 1/2005 | Modak et al. |
| 6,846,846 | B2 | 1/2005 | Modak et al. |
| 6,861,060 | B1 | 3/2005 | Luriya et al. |
| 6,883,778 | B1 | 4/2005 | Newton et al. |
| 6,887,270 | B2 | 5/2005 | Miller et al. |
| 6,896,889 | B2 | 5/2005 | Chevalier et al. |
| 7,008,404 | B2 | 3/2006 | Nakajima |
| 7,074,839 | B2 | 7/2006 | Fansler et al. |
| 7,098,256 | B2 * | 8/2006 | Ong ............ A01N 25/10 428/413 |
| 7,179,849 | B2 | 2/2007 | Terry |
| 7,198,800 | B1 | 4/2007 | Ko |
| 7,232,428 | B1 | 6/2007 | Inukai et al. |
| 7,232,540 | B2 | 6/2007 | Gould et al. |
| 7,261,925 | B2 | 8/2007 | Nesbitt |
| 7,268,165 | B2 | 9/2007 | Greten et al. |
| 7,347,839 | B2 | 3/2008 | Hiejima |
| 7,374,798 | B2 | 5/2008 | Choo et al. |
| 7,396,346 | B2 | 7/2008 | Nakajima |
| 7,407,707 | B2 | 8/2008 | Gould et al. |
| 7,462,401 | B2 | 12/2008 | Halfyard et al. |
| 7,470,254 | B2 | 12/2008 | Basta et al. |
| 7,494,339 | B2 | 2/2009 | Dias et al. |
| 7,498,367 | B2 | 3/2009 | Qian |
| 7,514,477 | B2 | 4/2009 | Klare et al. |
| 7,608,082 | B2 | 10/2009 | Cuevas et al. |
| 7,704,935 | B1 | 4/2010 | Davis et al. |
| 7,736,339 | B2 | 6/2010 | Woehr et al. |
| 7,816,434 | B2 | 10/2010 | Hackbarth et al. |
| 7,871,649 | B2 | 1/2011 | Modak et al. |
| 7,874,467 | B2 | 1/2011 | Pardes et al. |
| 7,914,494 | B2 | 3/2011 | Hiejima |
| 7,981,475 | B2 | 7/2011 | Takahashi |
| 8,034,454 | B2 | 10/2011 | Terry |
| 8,034,455 | B2 | 10/2011 | Wang et al. |
| 8,067,402 | B2 | 11/2011 | Whiteford et al. |
| 8,227,050 | B1 | 7/2012 | O'Neil |
| 8,231,602 | B2 | 7/2012 | Anderson et al. |
| 8,263,102 | B2 | 9/2012 | Labrecque et al. |
| 8,268,381 | B2 | 9/2012 | Whiteford et al. |
| 8,343,523 | B2 | 1/2013 | Toreki et al. |
| 8,343,525 | B2 | 1/2013 | Davis et al. |
| 8,357,119 | B2 | 1/2013 | Stout et al. |
| 8,388,583 | B2 | 3/2013 | Stout et al. |
| 8,414,547 | B2 | 4/2013 | DiFiore et al. |
| 8,512,294 | B2 | 8/2013 | Ou-Yang et al. |
| 8,622,995 | B2 | 1/2014 | Ziebol et al. |
| 8,622,996 | B2 | 1/2014 | Ziebol et al. |
| 8,728,030 | B2 | 5/2014 | Woehr |
| 8,840,927 | B2 * | 9/2014 | Ditizio et al. ............ 424/486 |
| 9,078,441 | B2 | 7/2015 | Raad |
| 9,138,252 | B2 | 9/2015 | Bierman et al. |
| 2001/0010016 | A1 | 7/2001 | Modak et al. |
| 2001/0016589 | A1 | 8/2001 | Modak et al. |
| 2001/0018095 | A1 | 8/2001 | Shlenker et al. |
| 2001/0032006 | A1 | 10/2001 | Griffin, III et al. |
| 2001/0053895 | A1 | 12/2001 | Vaillancourt |
| 2001/0056133 | A1 | 12/2001 | Montgomery et al. |
| 2002/0009436 | A1 | 1/2002 | Doyle et al. |
| 2002/0022660 | A1 | 2/2002 | Jampani et al. |
| 2002/0028751 | A1 | 3/2002 | Lokkesmoe et al. |
| 2002/0037260 | A1 | 3/2002 | Budny et al. |
| 2002/0040092 | A1 | 4/2002 | Siddiqui et al. |
| 2002/0064858 | A1 | 5/2002 | Yacoby-Zeevi |
| 2002/0091424 | A1 | 7/2002 | Biel |
| 2002/0119111 | A1 | 8/2002 | Kilgour et al. |
| 2002/0133124 | A1 | 9/2002 | Leinsing et al. |
| 2002/0144705 | A1 | 10/2002 | Brattesani et al. |
| 2003/0023208 | A1 | 1/2003 | Osypka et al. |
| 2003/0060804 | A1 | 3/2003 | Vaillancourt |
| 2003/0068667 | A1 | 4/2003 | Olson et al. |
| 2003/0072781 | A1 | 4/2003 | Pelerin |
| 2003/0105143 | A1 | 6/2003 | Ammendola et al. |

(56) References Cited

U.S. PATENT DOCUMENTS

| | | |
|---|---|---|
| 2003/0119932 A1 | 6/2003 | Al-Akhdar et al. |
| 2003/0134783 A1 | 7/2003 | Harshey et al. |
| 2003/0144362 A1 | 7/2003 | Utterberg et al. |
| 2003/0147932 A1 | 8/2003 | Nun et al. |
| 2003/0162839 A1 | 8/2003 | Symington et al. |
| 2003/0170308 A1 | 9/2003 | Cleary et al. |
| 2003/0176848 A1 | 9/2003 | Gibson et al. |
| 2003/0206875 A1 | 11/2003 | Budny et al. |
| 2003/0215433 A1 | 11/2003 | Kokai-Kun et al. |
| 2003/0224032 A1 | 12/2003 | Read et al. |
| 2004/0013574 A1 | 1/2004 | Conway |
| 2004/0013703 A1 | 1/2004 | Ralph et al. |
| 2004/0014864 A1 | 1/2004 | Milic et al. |
| 2004/0039349 A1 | 2/2004 | Modak et al. |
| 2004/0058829 A1 | 3/2004 | Hei et al. |
| 2004/0109852 A1 | 6/2004 | Xu |
| 2004/0115477 A1 | 6/2004 | Nesbitt |
| 2004/0132164 A1 | 7/2004 | Doyle et al. |
| 2004/0180829 A1 | 9/2004 | Bassler et al. |
| 2004/0185296 A1 | 9/2004 | Mazzanti |
| 2004/0230162 A1 | 11/2004 | Tan |
| 2004/0234475 A1 | 11/2004 | Lannibois-Drean et al. |
| 2005/0008671 A1 | 1/2005 | Van Antwerp |
| 2005/0048005 A1 | 3/2005 | Stockel |
| 2005/0048124 A1 | 3/2005 | Sarangapani |
| 2005/0059731 A1 | 3/2005 | Albrecht et al. |
| 2005/0080158 A1 | 4/2005 | Ong et al. |
| 2005/0100580 A1 | 5/2005 | Osborne et al. |
| 2005/0118239 A1 | 6/2005 | Sabesan |
| 2005/0124970 A1 | 6/2005 | Kunin et al. |
| 2005/0131356 A1 | 6/2005 | Ash et al. |
| 2005/0143286 A1 | 6/2005 | Singh et al. |
| 2005/0148928 A1 | 7/2005 | Molina et al. |
| 2005/0158253 A1 | 7/2005 | Budny et al. |
| 2005/0176905 A1 | 8/2005 | Moon et al. |
| 2005/0233950 A1 | 10/2005 | Madhyastha |
| 2005/0265931 A1 | 12/2005 | Qian |
| 2006/0024372 A1 | 2/2006 | Utterberg et al. |
| 2006/0051385 A1 | 3/2006 | Scholz |
| 2006/0163515 A1 | 7/2006 | Ruschke |
| 2006/0165751 A1 | 7/2006 | Chudzik et al. |
| 2006/0165903 A1 | 7/2006 | Mazzanti |
| 2006/0177477 A1 | 8/2006 | Ash et al. |
| 2006/0239954 A1 | 10/2006 | Sancho |
| 2006/0258780 A1 | 11/2006 | Chaussade et al. |
| 2006/0281663 A1 | 12/2006 | Asmus |
| 2007/0000407 A1 | 1/2007 | Leong |
| 2007/0083157 A1 | 4/2007 | Belley et al. |
| 2007/0083162 A1 | 4/2007 | O'Reagan et al. |
| 2007/0112112 A1 | 5/2007 | Kerschner et al. |
| 2007/0112146 A1 | 5/2007 | Falk et al. |
| 2007/0129690 A1 | 6/2007 | Rosenblatt et al. |
| 2007/0141524 A1 | 6/2007 | Brennan et al. |
| 2007/0160547 A1 | 7/2007 | Duffy et al. |
| 2007/0166344 A1 | 7/2007 | Qu et al. |
| 2007/0202177 A1 | 8/2007 | Hoang |
| 2007/0203574 A1 | 8/2007 | McGrath et al. |
| 2007/0225179 A1 | 9/2007 | Schutz et al. |
| 2007/0233007 A1 | 10/2007 | Adams |
| 2007/0275101 A1 | 11/2007 | Lu et al. |
| 2007/0281198 A1 | 12/2007 | Lousenberg |
| 2008/0026026 A1 | 1/2008 | Lu et al. |
| 2008/0039796 A1 | 2/2008 | Nakajima |
| 2008/0051737 A1 | 2/2008 | Paul et al. |
| 2008/0075761 A1 | 3/2008 | Modak et al. |
| 2008/0108944 A1 | 5/2008 | Woehr et al. |
| 2008/0119789 A1 | 5/2008 | Kaemmerer |
| 2008/0161763 A1 | 7/2008 | Harding et al. |
| 2008/0182921 A1 | 7/2008 | Suh et al. |
| 2008/0194707 A1 | 8/2008 | Potter |
| 2009/0012220 A1 | 1/2009 | Yamane et al. |
| 2009/0036768 A1 | 2/2009 | Seehusen et al. |
| 2009/0101152 A1 | 4/2009 | Burk et al. |
| 2009/0110844 A1 | 4/2009 | Platzer et al. |
| 2009/0114327 A1 | 5/2009 | Breunig |
| 2009/0117164 A1 | 5/2009 | Toreki et al. |
| 2009/0125118 A1 | 5/2009 | Gong |
| 2009/0162530 A1 | 6/2009 | Nesbitt |
| 2009/0176907 A1 | 7/2009 | Subramanian et al. |
| 2009/0188559 A1 | 7/2009 | Nesbitt |
| 2009/0220739 A1 | 9/2009 | Chougule |
| 2009/0226541 A1 | 9/2009 | Scholz et al. |
| 2009/0281525 A1 | 11/2009 | Harding et al. |
| 2009/0317435 A1* | 12/2009 | Vandesteeg et al. ......... 424/411 |
| 2009/0324666 A1 | 12/2009 | Krongauz et al. |
| 2010/0106102 A1 | 4/2010 | Ziebol et al. |
| 2010/0135949 A1* | 6/2010 | Ou-Yang .................... 424/78.17 |
| 2010/0136209 A1 | 6/2010 | Ou-Yang et al. |
| 2010/0137379 A1 | 6/2010 | Ou-Yang |
| 2010/0137472 A1 | 6/2010 | Ou-Yang |
| 2010/0204648 A1 | 8/2010 | Stout et al. |
| 2010/0204675 A1 | 8/2010 | Woehr et al. |
| 2010/0222746 A1 | 9/2010 | Burkholz |
| 2011/0009831 A1 | 1/2011 | Burkholz et al. |
| 2011/0065798 A1 | 3/2011 | Hoang et al. |
| 2011/0146680 A1 | 6/2011 | Conway |
| 2011/0150958 A1 | 6/2011 | Davis et al. |
| 2011/0160663 A1 | 6/2011 | Stout et al. |
| 2011/0218529 A1 | 9/2011 | Garcia et al. |
| 2011/0301553 A1 | 12/2011 | Goral et al. |
| 2011/0319825 A1 | 12/2011 | Goral et al. |
| 2012/0083750 A1 | 4/2012 | Sansoucy |
| 2012/0103448 A1 | 5/2012 | Hopf et al. |
| 2013/0165868 A1 | 6/2013 | Isaacson et al. |
| 2013/0196079 A1* | 8/2013 | Schwalm .................. C09D 5/14 427/551 |
| 2013/0245568 A1 | 9/2013 | Kerr |
| 2013/0274686 A1 | 10/2013 | Ziebol et al. |

FOREIGN PATENT DOCUMENTS

| | | |
|---|---|---|
| CN | 1187598 A | 7/1998 |
| CN | 1526771 | 9/2004 |
| CN | 101353545 A | 1/2009 |
| CN | 102070983 A | 5/2011 |
| DE | 4011867 A1 | 10/1991 |
| EP | 0 036 294 A2 | 9/1981 |
| EP | 0 070 087 A1 | 1/1983 |
| EP | 0 338 418 A1 | 10/1989 |
| EP | 0 370 997 A2 | 5/1990 |
| EP | 0 379 271 A2 | 7/1990 |
| EP | 0 396 431 A1 | 11/1990 |
| EP | 0 414 997 A1 | 3/1991 |
| EP | 0 778 337 A2 | 11/1997 |
| EP | 0 992 252 A2 | 4/2000 |
| JP | 05-277434 | 10/1993 |
| JP | 07-051651 | 2/1995 |
| JP | H07-47435 A | 2/1995 |
| JP | 08-209064 | 8/1996 |
| JP | 8-311373 A | 11/1996 |
| JP | 09-151262 | 6/1997 |
| JP | 09-157548 | 6/1997 |
| JP | H09-176677 A | 7/1997 |
| JP | H10-231 A | 1/1998 |
| JP | H11-322560 A | 11/1999 |
| JP | 2000-178475 A | 6/2000 |
| JP | 2000-264803 A | 9/2000 |
| JP | 2001-072438 A | 3/2001 |
| JP | 2002-282762 | 10/2002 |
| JP | 2003-342402 | 12/2003 |
| JP | 2004-043669 A | 2/2004 |
| JP | 2005-028209 A | 2/2005 |
| JP | 2005-515838 A | 6/2005 |
| JP | 2005-520912 A | 7/2005 |
| JP | 2007-016096 A | 1/2007 |
| JP | 2010-536836 A | 12/2010 |
| KR | 20020066429 A | 8/2002 |
| KR | 20080039460 A | 5/2008 |
| WO | 94/22522 A1 | 10/1994 |
| WO | 95/21648 A1 | 8/1995 |
| WO | 96/40359 A1 | 12/1996 |
| WO | 98/58690 | 12/1998 |
| WO | 98/58989 | 12/1998 |
| WO | 99/32168 | 7/1999 |

(56) References Cited

FOREIGN PATENT DOCUMENTS

| WO | 99/34849 | A1 | | 7/1999 | |
|---|---|---|---|---|---|
| WO | 99/36490 | A1 | | 7/1999 | |
| WO | 99/43971 | A1 | | 9/1999 | |
| WO | 00/66189 | | | 11/2000 | |
| WO | 00/74743 | A1 | | 12/2000 | |
| WO | WO01-95862 | | * | 12/2001 | ............ A61K 6/083 |
| WO | 2004/108091 | A2 | | 12/2004 | |
| WO | 2005/037340 | A2 | | 4/2005 | |
| WO | 2006/056482 | A1 | | 6/2006 | |
| WO | 2006/074666 | A2 | | 7/2006 | |
| WO | 2006/088288 | A1 | | 8/2006 | |
| WO | 2006/099358 | A2 | | 9/2006 | |
| WO | 2006/099359 | A2 | | 9/2006 | |
| WO | 2007/064835 | A2 | | 6/2007 | |
| WO | 2007/095576 | A2 | | 8/2007 | |
| WO | 2007/100653 | A2 | | 9/2007 | |
| WO | 2007/100776 | A2 | | 9/2007 | |
| WO | 2008/014438 | A2 | | 1/2008 | |
| WO | 2008/014447 | A2 | | 1/2008 | |
| WO | 2008/031601 | A1 | | 3/2008 | |
| WO | 2008/045761 | A2 | | 4/2008 | |
| WO | 2008/128896 | A2 | | 10/2008 | |
| WO | 2008/132045 | A2 | | 11/2008 | |
| WO | 2009/070227 | A1 | | 6/2009 | |
| WO | 2011/005951 | A2 | | 1/2011 | |
| WO | 2011/034675 | A2 | | 3/2011 | |
| WO | 2011/048204 | A2 | | 4/2011 | |
| WO | 2011/118680 | A1 | | 9/2011 | |
| WO | 2012/036916 | A1 | | 3/2012 | |
| WO | 2013/009998 | A2 | | 1/2013 | |
| WO | 2013/134421 | A1 | | 9/2013 | |

OTHER PUBLICATIONS

"UV & EB Cure," Xiper Innovations, Inc., http://xiperinnovations.com/uv_eb_cure, Printed Apr. 22, 2013.
Cabot Corporation, "Using Silicas and Aluminas in Coatings,", www.cabot-corp.com/Silicas-And-Aluminas/Coatings, downloaded from the internet on Apr. 26, 2011.
McDonnell, G., Russell, A.D. Antiseptics and Disinfectants: Activity, Action, and Resistance. Clinical Microbiology Reviews, (1999) 12(1), pp. 149-179.
Elson Silva, PhD, "Respecting Hydrology Science in the Patenting System," pp. 1-7, Jan. 13, 2011.
Gama Healthcare, Clinell Alcoholic 2% Chlorhexidine, http://www.gamahealthcare.com/clinellaca2c.html, pp. 1-3, Nov. 7, 2008.
Enturia, ChloraPrep, http://www.enturia.com/products/chloraPrep-product.html, pp. 1-3, Oct. 31, 2008.
Sage Products, Inc., Address Multi-Drug Resistant Organism on the Skin with Early Preop Prep, http://www.sageproducts.com/products/ssi-prevention.cfm, 1 page, Oct. 31, 2008.
Sage Products, Inc., Preoperative Skin Preparation and Perioperative Oral Care for the Short-Term Ventilated Patient, http://www.sageproducts.com/products/ssi-vap-prevention.cfm, 1 page, Oct. 31, 2008.
Sage Products, Inc., Preoperative Skin Preparation for the Surgical Patient, http://www.sageproducts.com/products/skin-prep.cfm, 1 page, Oct. 31, 2008.

* cited by examiner

| | % kill for microorganism | | | | | |
|---|---|---|---|---|---|---|
| | Candida albicans | | Pseudomonas aeruginosa | | Staphylococcus epidermidis | |
| Sample # | time 0 | after 7 day preconditioning | time 0 | after 7 day preconditioning | time 0 | after 7 day preconditioning |
| 1 | 100 | 99.32474 | 100 | 99.94724 | 99.99977 | 99.84784 |
| 2 | 99.99969 | 99.98851 | 99.99999 | 99.99997 | 100 | 99.97153 |
| 3 | 99.98815 | 99.99992 | 99.99999 | 99.99999 | 99.99953 | 99.99411 |
| 4 | 99.99969 | 99.99994 | 99.99928 | 100 | 100 | 99.99607 |
| 5 | 79.60467 | 43.33333 | 99.99788 | 99.97878 | 64.36222 | 76.13483 |
| 6 | 91.74257 | NA | 99.98535 | NA | 80.96671 | NA |

UV CURABLE SOLVENTLESS ANTIMICROBIAL COMPOSITIONS

BACKGROUND OF THE INVENTION

The present invention relates to antimicrobial compositions and methods for use of those compositions in various medical applications. One of the major challenges of modern medical treatment is the prevention of infection by microbial organisms.

One area where this challenge is constantly presented is in infusion therapy. Infusion therapy is one of the most common health care procedures. Hospitalized, home care, and other patients receive fluids, pharmaceuticals, and blood products via vascular access devices inserted into the vascular system. Infusion therapy may be used to treat an infection, provide anesthesia or analgesia, provide nutritional support, treat cancerous growths, and maintain blood pressure and heart rhythm, among many other clinically significant uses.

Infusion therapy is facilitated by a vascular access device. The vascular access device may access a patient's peripheral or central vasculature. The vascular access device may be indwelling for short term (days), moderate term (weeks), or long term (months to years). The vascular access device may be used for continuous infusion therapy or for intermittent therapy.

A common vascular access device is a plastic catheter that is inserted into a patient's vein. The catheter length may vary from a few centimeters for peripheral access to many centimeters for central access by devices such as central vascular catheters (CVC) and peripherally inserted central catheters (PICC). The catheter may be inserted transcutaneously or may be surgically implanted beneath the patient's skin. The catheter, or any other vascular access device attached thereto, may have a single lumen or multiple lumens for infusion of many fluids simultaneously.

The vascular access device commonly includes a Luer adapter to which other medical devices may be attached. For example, an administration set may be attached to a vascular access device at one end and an intravenous (IV) bag at the other. The administration set is then a fluid conduit for the continuous infusion of fluids and pharmaceuticals. Commonly, an IV access device is attached to another vascular access device that acts to close the vascular access device, thus allowing for the intermittent infusion or injection of fluids and pharmaceuticals. An IV access device may include a housing and septum for closing the system, the latter of which may be opened with a blunt cannula or male Luer of a medical device.

Accessing the vascular access device could lead to certain complications due to several factors, such as contamination. Complications associated with infusion therapy may cause significant morbidity and even mortality. One significant complication is catheter related blood stream infection (CRBSI). An estimated 250,000-400,000 cases of central venous catheter (CVC) associated blood stream infections (BSIs) occur annually in US hospitals. Attributable mortality is an estimated 12%-25% for each infection and costs the health care system $25,000-$56,000 per episode.

A vascular access device may serve as a nidus of infection, resulting in a disseminated BSI. This may be caused by failure to regularly flush the device, a non-sterile insertion technique, or by pathogens that enter the fluid flow path through either end of the path subsequent to catheter insertion. When a vascular access device is contaminated, pathogens adhere to the vascular access device, colonize, and form a biofilm. The biofilm is resistant to most biocidal agents and provides a replenishing source of pathogens to enter a patient's bloodstream and cause a BSI. Thus, devices with antimicrobial properties are needed.

One approach to preventing biofilm formation and patient infection is to provide an antimicrobial coating on various medical devices and components. Over the last 35 years, it has been common practice to use a thermoplastic polyurethane solution as the carrier for antimicrobial coatings. The solvent is usually tetrahydrofuran (THF), dimethylformamide (DMF), or a blend of both. Since THF can be oxidized very quickly and tends to be very explosive, an expensive explosion-proof coating facility is necessary. These harsh solvents also attack many of the polymeric materials commonly used, including polyurethane, silicone, polyisoprene, butyl rubber polycarbonate, rigid polyurethane, rigid polyvinyl chloride, acrylics, and styrene-butadiene rubber (SBR). Therefore, medical devices made with these materials can become distorted over time and/or form microcracks on their surfaces. Another issue with this type of coating is that it takes almost 24 hours for the solvent to be completely heat evaporated. Accordingly, conventional technology has persistent problems with processing, performance, and cost.

Another limitation is the availability of suitable antimicrobial agents for use in such coatings. One of the most commonly used antimicrobial agents used in coating medical devices is silver, as described in U.S. Pat. No. 4,933,178. Silver salts and elemental silver are well known antimicrobial agents in both the medical surgical industry and general consumer products industries. They are usually incorporated into the polymeric bulk material or coated onto the surface of the medical devices by plasma, heat evaporation, electroplating, or conventional solvent coating technologies. These technologies are tedious, expensive, and not environmentally friendly.

In addition, the performance of silver coated medical devices is mediocre at best. For example, it can take up to eight (8) hours before the silver ion, ionized from silver salts or elemental silver, to be efficacious as an antimicrobial agent. As a result, substantial microbial activity can occur prior to the silver coating even becoming effective. Furthermore, many antimicrobial coatings with a silver compound or elemental silver are opaque, thus preventing the visualization of the fluid path in a vascular access device. Such visualization could be important to practitioners as an indicator of the progress of IV therapy. Added processing steps and cost are needed to improve the transparency of silver based antimicrobial coatings, as described in U.S. Pat. No. 8,178,120.

In U.S. Pat. Appl. No. 20100135949, Ou Yang disclosed a UV curable antimicrobial coating that was much cheaper to process and possessed superior antimicrobial efficacy in comparison to silver based antimicrobial coatings technology. However, a rheology modifier was required of this composition to prevent phase separation of the insoluble antimicrobial agent from the rest of the coating composition. The use of the rheology modifier increases the coating viscosity substantially, thus prohibiting the use of spraying as a coating application method. Accordingly, a solvent must be added to the coating composition to achieve a workable, sprayable viscosity, as described in U.S. Pat. Appl. No. 20100137472. The use of a solvent may be undesirable, as indicated above. Further, the addition of a solvent to lower the viscosity of the coating composition will result in increased phase separation of the antimicrobial agent within the coating composition.

Accordingly, there is a need in the art for improved compositions that impart antimicrobial capability to medical devices of various types, particularly devices related to infusion therapy. Specifically, there is a need for an effective antimicrobial coating that can be easily applied to medical devices constructed of polymeric materials and metals. There is also a need for improved methods of applying such antimicrobial coatings to medical devices. Further, there is a need for an effective antimicrobial coating comprising insoluble antimicrobial agents that are evenly disbursed within the matrix of the coating composition without observable phase separation.

BRIEF SUMMARY OF THE INVENTION

The present invention has been developed in response to problems and needs in the art that have not yet been fully resolved by currently available antimicrobial compositions and methods. Thus, these compositions and methods are developed to reduce complications, such as the risk and occurrence of CRBSIs, by providing improved antimicrobial compositions and methods of application for use in conjunction with medical devices.

The present invention relates to ultraviolet (UV)-curable coatings that have antimicrobial properties. The coatings may be cured by light in the range from about 200 nm to about 600 nm. In some embodiments, it may be preferable to cure the composition with light in the range of about 300 nm to about 450 nm. These coatings are particularly adaptable for use on medical devices, particularly medical devices used in infusion therapy, such as needleless valves, stopcocks, infusion sets, and catheters. As mentioned above, these medical devices are often composed of polymeric materials, especially polycarbonate (PC), polyurethane (PU), polyvinyl chloride (PVC), styrene-butadiene rubber (SBR), and acrylics.

In one aspect of the invention the surfaces of such devices are coated with a UV-curable coating (sometimes hereinafter referred to as "UV coating"), which comprises a UV curable composition and additional components incorporated therein, such as antimicrobial agents uniformly distributed throughout its matrix. The antimicrobial agents are able to diffuse through and leach from the matrix and kill microscopic organisms that are in close proximity to the coating surface. The antimicrobial agents, which are uniformly distributed in the UV coating matrix, gradually leach out of the matrix when an IV solution diffuses into the matrix. The antimicrobial agents are then available to kill the microbes that are in close proximity to the coating surface.

The formulations of this invention are generally composed of a combination of urethane or polyester-type oligomers with acrylate functional groups, acrylate monomers, photoinitiators, and antimicrobial agents. The UV coating is in liquid form prior to UV curing. For some formulations, the antimicrobial agents are relatively insoluble in the liquid coating. Accordingly, the systems and methods of the present invention provide UV curable antimicrobial compositions comprising insoluble antimicrobial particles on the nano- or micro-scale that are uniformly distributed throughout the whole coating matrix without the use of a rheological modifying agent.

The coatings of the present invention are solventless and can be sprayed, wiped, dipped or distributed by using other conventional coating methods to coat a substrate's surface. They can then be rapidly cured with ultraviolet light. Curing may be completed in seconds or minutes depending on the formulation and curing conditions. The coatings of the present invention are generally efficacious within minutes instead of hours, as with conventional coatings. The cured coatings are generally colorless and transparent or translucent. The transparency provides the important means to visualize the fluid path within the coated medical device.

A wide variety of polymers can be used within the scope of the present invention. It is only necessary that the oligomers and monomers be capable of UV curing and of suspending or solvating the antimicrobial agents of the type described herein. For example, the oligomers can be acrylated aliphatic urethanes, acrylated aromatic urethanes, acrylated polyesters, unsaturated polyesters, acrylated polyethers, acrylated acrylics, and the like, or combinations of the above. The acrylated functional group can be mono-functional, di-functional, tri-functional, tetra-functional, penta-functional, or hexa-functional.

As with the oligomers, a wide range of monomers can be used in the present compositions. Once again, it is only necessary that the overall composition be UV-curable and that the composition be capable of suspending or solvating the antimicrobial agents. For example, the monomers can be 2-ethyl hexyl acrylate, isooctyl acrylate, isobornylacrylate, 1,6-hexanediol diacrylate, diethylene glycol diacrylate, triethylene glycol diacrylate, pentaerythritol tetra acrylate, penta erythritol tri acrylate, dimethoxy phenyl acetophenone hexyl methyl acrylate, 1,6 hexanidiol methacrylate, and the like, or combinations of these compounds.

In order to allow for UV-curing, the composition should be provided with an adequate and compatible photoinitiator. In certain embodiments of the invention, the photoinitiators can be: 1) single molecule cleavage type, such as benzoin ethers, acetophenones, benzoyl oximes, and acyl phosphine oxide, or 2) hydrogen abstraction type, such as Michler's ketone, thioxanthone, anthroguionone, benzophenone, methyl diethanol amine, 2-N-butoxyethyl-4-(dimethylamino) benzoate, and the like, or combinations of these materials.

Various antimicrobial agents may be used in the compositions of the present invention. In general, antimicrobial agents of the present invention comprise insoluble antimicrobial agents having a particle size of less than 15 μm. The small particle size of the antimicrobial agents facilitates even distribution of the insoluble antimicrobial agent within the matrix of the coating composition without undergoing phase separation.

Previously, a rheological modifying agent was required to modify the viscosity of the coating composition to avoid phase separation. The high viscosity of the coating materials presented difficulties for applying the coating materials by spraying. Solvents were added to the coating materials to decrease the viscosity and improve the flow properties of the coating material. However, these solvents are largely undesirable due to their caustic properties. Further, these solvents are generally flammable and therefore difficult to work with safely. Further still, the addition of solvents decreases the overall viscosity of the coating composition, thereby enhancing phase separation of the antimicrobial agents within the matrix of the coating composition.

In contrast, the coating compositions of the present invention utilize antimicrobial agents of small particle size to provide a stable, low viscosity coating composition that may be applied by spraying without the use of solvents. In some instances, an antimicrobial agent is provided having a particle size of 15 μm or less. The time it takes for phase separation to occur is inversely proportional to the square of the particle sizes. By limiting the mean particle size to be 15 μm or less, the time to phase separation is increased substantially to be practically useful. Thus, a coating formulation is provided which eliminates the need for rheological modifiers and solvents to provide a stable, sprayable coating composition. In particular, the fine particle size is able to stay suspended in the matrix of the UV curable coating without observable phase separation.

The antimicrobial agents of the present invention are generally compatible with the other components of the composition. The antimicrobial agents are further effective in eliminating microbes and other undesirable pathogens. Specifically, it is preferred that that antimicrobial agent not chemically react with the other components of the composition. Examples of suitable antimicrobial agents within the scope of the present invention include aldehydes, anilides, biguanides, elemental silver or its compounds, bis-phenols, and quaternary ammonium compounds and the like or combinations of the above.

The formulations of the present invention also demonstrate good adhesion to numerous plastic surfaces (such as PC, PU, PVC, acrylics, and SBR). The formulation can be cured with adequate ultraviolet light (wavelengths of approximately 200 nm to 600 nm, and in certain embodiments in the range of from about 300 nm to about 450 nm). When cured the coating is substantially transparent or translucent, thus providing a means for visualizing the fluid path of coated medical devices, such as needleless connectors, stopcocks, Luer accessing devices, and IV catheters.

Accordingly, the present invention provides antimicrobial coating compositions that overcome many of the limitations of existing technology. The present invention employs known components which have achieved acceptance for medical use. These components are combined and used easily and efficiently. As set forth above, the compositions of the present invention generally including oligomers, monomers, photoinitiators, and fine insoluble antimicrobial agents. The resulting compositions are easily applied to the surfaces of medical devices and quickly cured by UV light.

BRIEF DESCRIPTION OF THE DRAWINGS

The foregoing and other objects and features of the present invention will become more fully apparent from the accompanying drawings when considered in conjunction with the following description. Although the drawings depict only typical embodiments of the invention and are thus not to be deemed as limiting the scope of the invention, the accompanying drawings help explain the invention in added detail.

DETAILED DESCRIPTION OF THE INVENTION

This detailed description of the invention provides additional description of each of the aspects of the invention summarized above. In one aspect of the invention, an antimicrobial ultra violet (UV)-curable coating is provided. The coating comprising a UV curable composition comprising an oligomer, a monomer, and a photoinitiator that are together capable of forming a UV curable polymer composition. Further incorporated within the UV curable coating compositions is an effective antimicrobial agent.

The UV curable coating compositions comprise primarily one or more oligomers and one or more monomers, combined with one or more suitable photoinitiators. In the following discussion, the UV curable coating composition will comprise 100 parts by weight. Materials added to the UV curable coating composition may include soluble antimicrobial agents, insoluble antimicrobial agents, and other additives. These materials will be defined in parts by weight added to 100 parts by weight of the UV curable coating composition.

The oligomer is generally selected from the group consisting of acrylated aliphatic urethanes, acrylated aromatic urethanes, acrylated polyesters, unsaturated polyesters, acrylated polyethers, acrylated acrylics, and the like, or combinations thereof. The acrylated functional group is selected from the group consisting of mono-functional, di-functional, tri-functional, tetra-functional, penta-functional, and hexa-functional acrylates. Any oligomer that is compatible with the other components of the composition is usable within the scope of the present invention. The oligomer will typically comprise from about 10% to about 90% of the UV curable composition. In some embodiments the oligomer will comprise from about 20% to about 80% of the UV curable composition. In certain embodiments of the invention the oligomer will comprise from about 30% to about 70% of the UV curable composition.

The monomer is selected from the group consisting of 2-ethyl hexyl acrylate, isooctyl acrylate, isobornylacrylate, 1,6-hexanediol diacrylate, diethylene glycol diacrylate, triethylene glycol diacrylate, pentaerythritol tetra acrylate, penta erythritol tri acrylate, dimethoxy phenyl acetophenone hexyl methyl acrylate, 1,6 hexanidiol methacrylate and the like, or combinations of these compounds. Once again any monomer that is compatible with the other components of the composition is usable within the scope of the present invention. The monomer will typically comprise from about 5% to about 90% of the UV curable composition. In some embodiments the monomer will comprise from about 10% to about 75% of the UV curable composition. In certain embodiments of the invention the monomer will comprise from about 20% to about 60% of the UV curable composition.

The photoinitiator is selected from the group consisting of single molecule cleavage type, such as benzoin ethers, acetophenones, benzoyl oximes, and acyl phosphine oxide, and hydrogen abstraction types consisting of Michler's ketone, thioxanthone, anthroguionone, benzophenone, methyl diethanol amine, and 2-N-butoxyethyl-4-(dimethylamino)benzoate. The photoinitiator will also be selected such that it is compatible with the other components of the composition identified within the scope of the present invention. The photoinitiator will typically comprise from about 0.5% to about 10% of the UV curable composition. In some embodiments the photoinitiator will comprise from about 1% to about 8.5% of the UV curable composition. In certain embodiments of the invention the photoinitiator will comprise from about 2% to about 7% of the UV curable composition.

The antimicrobial agent is generally selected from the group consisting of aldehydes, anilides, biguanides, silver, silver compounds, bis-phenols, and quaternary ammonium compounds. The antimicrobial agent is generally present in the amount of from about 0.5 to about 50 parts by weight compared to 100 parts by weight of the UV curable composition. In other embodiments, the antimicrobial agent may be present in the amount of from about 0.5 to about 30 parts by weight of the composition. In certain further embodiments, the antimicrobial agent is present in the amount of from about 3 to about 14 parts by weight.

In some instances it is desirable to provide a sprayable, UV curable coating composition containing an insoluble antimicrobial agent. The antimicrobial agent is insoluble in the UV curable coating compositions but is soluble in infusion fluids. The coating is hydrophilic upon curing; therefore in clinical use scenarios, the IV fluid will diffuse into the cured antimicrobial coating and slowly dissolve the antimicrobial agents. The dissolved antimicrobial agent then leaches out of the antimicrobial coating and provides antimicrobial protection to the coated medical devices. The insoluble antimicrobial agent facilitates additional control over the antimicrobial agent's release rate beyond simple diffusion and leaching, thus providing a long lasting antimicrobial efficacy.

Insoluble antimicrobial agents may include any antimicrobial agent or combination of antimicrobial agents that are insolube in the UV curable coating compositions disclosed herein. In some embodiments, insoluble antimicrobial agents may further include antimicrobial agents or combinations of antimicrobial agents having low solubility. Further still, some embodiments of the present invention comprise a mixture of soluble and insoluble antimicrobial agents. In any event, it is preferred that the antimicrobial agent not react chemically with the other components of the compositions.

Non-limiting examples of insoluble antimicrobial agents include chlorhexidine diacetate, chlorhexidine base, alexidine(dihydrochloride), silver sulfadiazine, silver citrate, triclosan, octenidine(dihydrochloride), and rifampicin. Other insoluble antimicrobial agents may include alkylpyridinium iodide, and various amphiphilic peptides which are covalently bound to water-insoluble resins. Additional antimicrobial agents of the present invention may include silver acetate, centrimide, cetyl pyridium chloride, benzalkonium chloride, o-phthalaldehyde, and minocycline. Accordingly, some embodiments of the present invention may include a combination of soluble and insoluble antimicrobial agents.

Generally, insoluble materials are incapable of being dissolved within a liquid or solution. As such, the insoluble materials could separate from the liquid phase over time thereby resulting in a type of phase separation. In the present invention, phase separation of this sort is undesirable. In particular, phase separation by which insoluble antimicrobial agents are separated from the remaining components of the UV curable composition is undesirable.

Phase separation within an antimicrobial coating composition generally results in an uneven distribution of the insoluble antimicrobial agent within the coating material. This may lead to uneven disbursement of the antimicrobial agent in the final coating on the medical device. Accordingly, the present invention overcomes this type of phase separation by controlling the particle size of the antimicrobial agent. As such, a stable UV curable coating composition is provided.

The particle size of the antimicrobial agents of the present invention provides a significant delay in the phase separation process, thereby providing sufficient time to prepare, apply and cure the UV curable coating prior to observable phase separation. The velocity of a spherical antimicrobial particle falling in the viscous fluid matrix of the coating composition is proportional to the square of the radius of the antimicrobial agent sphere. Therefore, as the particle size of the antimicrobial agent decreases, the time it takes for phase separation to occur increases significantly. Additionally, antimicrobial particles do not create networks, as is observed with rheological modifiers, such as fumed silica. Thus, antimicrobial agent(s) may be added to the coating composition without substantially affecting the viscosity of the coating composition.

In some embodiments, a sprayable, UV curable coating composition comprises an insoluble antimicrobial agent having a particle size of less than approximately 10 μm, wherein the insoluble antimicrobial agent is present at a concentration of less than approximately 8.9% by weight to the remaining components of the UV curable coating composition. In other embodiments, a sprayable, UV curable coating composition comprises an insoluble antimicrobial agent having a particle size of less than approximately 15 μm, wherein the insoluble antimicrobial agent is present at a concentration of less than approximately 14.0% by weight to the remaining components of the UV curable coating composition. Further, in some embodiments, a sprayable, UV curable coating composition comprises an insoluble antimicrobial agent having a reduced particle size at a concentration from approximately 2.0% to approximately 14%, by weight.

The UV curable coating compositions of the present invention further comprise a working viscosity that permits the coating composition to be applied to a medical device by spraying. Accordingly, some embodiments of the present invention include an insoluble antimicrobial agent having at least one of the previously indicated reduced particle sizes, wherein the coating composition has a viscosity from approximately 5 centipoise to approximately 500 centipoise.

The use of insoluble antimicrobial agents having this particle size imparts two advantages to the UV curable coating composition over the prior art. First, the reduced particle size eliminates the need for a rheological modifier to prevent phase separation. The fine particle size of the antimicrobial agent is able to stay suspended in the matrix of the UV curable coating without observable phase separation. As such, the insoluble antimicrobial agent remains evenly distributed throughout the matrix of the coating composition throughout the application and UV curing processes. Once cured, the insoluble antimicrobial agent is free to leach out of the cured matrix of the coating, thereby imparting antimicrobial activity to fluids and surfaces in contact with, or in proximity to the coated surface of the medical device.

Second, the UV curable coating composition is significantly less viscous than the prior art formulations, which require the use of a rheological modifier to prevent phase separation. Accordingly, the combined advantages of the present invention provide a sprayable, UV curable coating composition in which insoluble antimicrobial agents may be used without requiring rheological modifiers or harsh solvents.

Some UV coating formulations of the present invention can be urethane or polyester type acrylate such as 7104, 7101, 7124-K, 7105-5K from Electronic Materials Inc. (EMI) (Breckenridge, Colo.), 1168-M, I-20781 from Dymax Corporation (Torrington, Conn.), and UV 630 from Permabond Engineering Adhesives (Somerset, N.J.).

The antimicrobial coating according to the present invention can be applied to wide range of medical devices used in infusion therapy such as, but not limited to, needleless connectors, stopcocks, IV sets, IV catheters, and Luer accessing devices.

EXAMPLES

Example 1

Needleless connectors coated with UV-curable coating compositions including chlorhexidine diacetate (CHA) within the scope of the present invention were tested for efficacy together with two commercially available needleless connectors: one with a silver based antimicrobial formulation and the other with a CHA impregnated septum. Samples #1. Composition per present invention with chlorhexidine diacetate 1%

2. Composition per present invention with chlorhexidine diacetate 3%

3. Composition per present invention with chlorhexidine diacetate 5%

4. Composition per present invention with chlorhexidine diacetate 9%

5. Needleless connector with chlorhexidine/silver impregnated septum

6. Needleless connector with silver based antimicrobial coating

Figure 1:
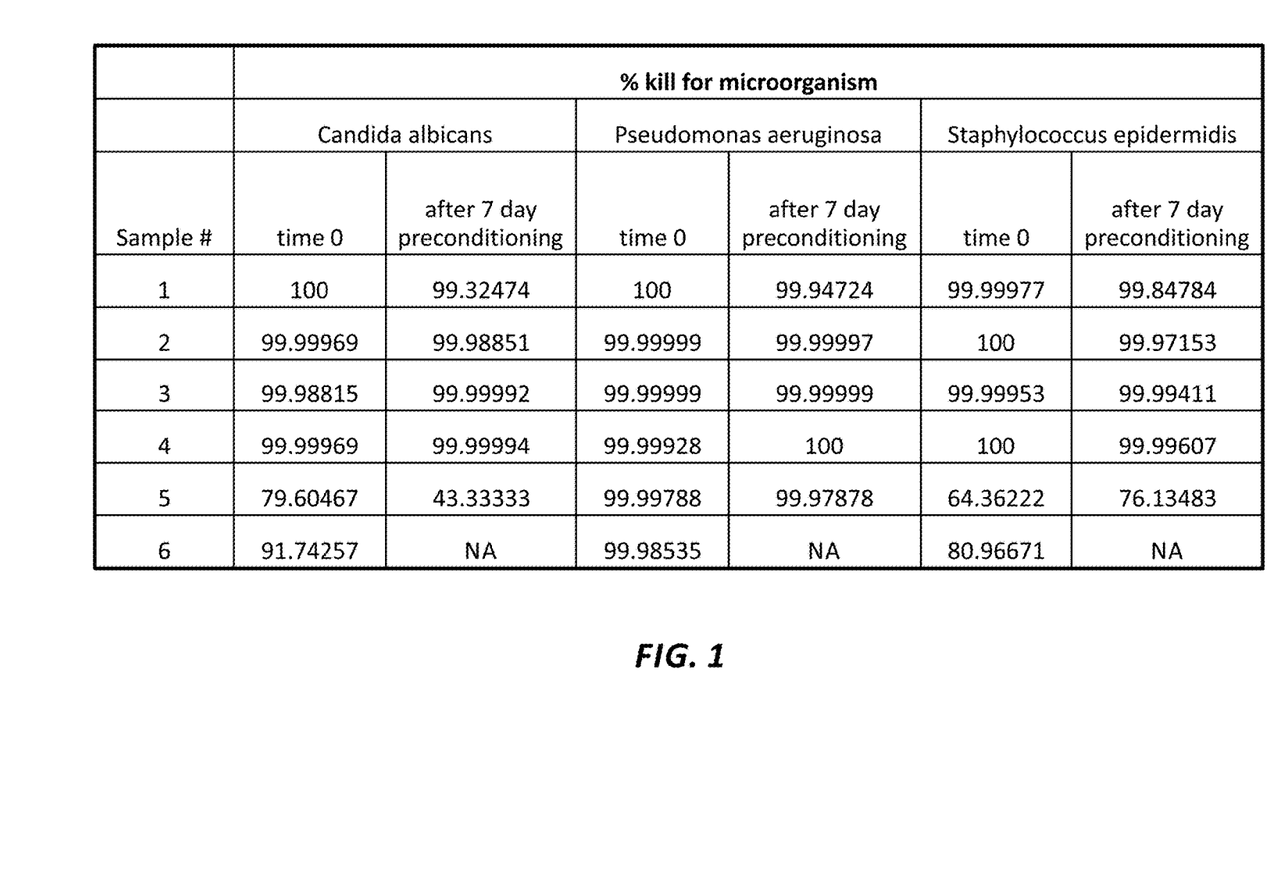
FIG. 1 shows a table summarizing the results of various tests conducted according to Example 1 disclosed herein, in accordance with a representative embodiment of the present invention.

Each sample was tested on three (3) microbial agents, namely: *Staphylococcus epidermidis* (gram positive bacteria); *Pseudomonas aeruginosa* (gram negative bacteria); and *Candida albicans* (yeast or fungi). The contact time was 24 hours. Some of the samples were preconditioned for 7 days with continuous IV fluid flowing through the samples prior to testing. The results are summarized in the table of FIG. 1 which shows a clear advantage of antimicrobial compositions according to the present invention over the existing technologies.

Example 2

Figure 2:
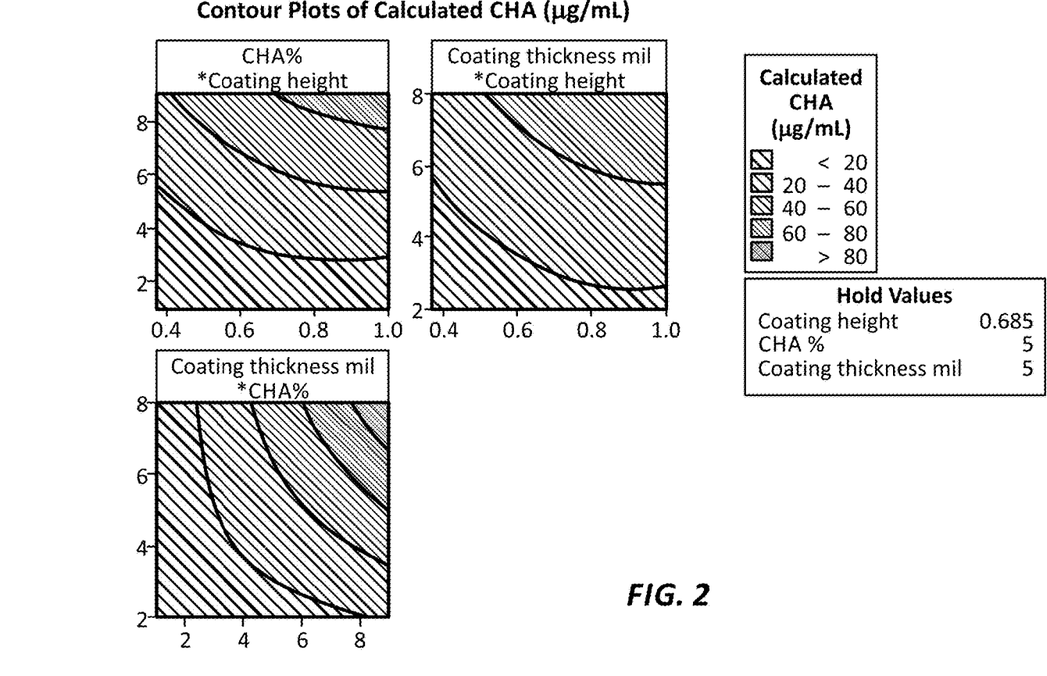
FIG. 2 shows various contour plots demonstrating antimicrobial agent elution rates in accordance with various representative embodiments of the present invention.

The antimicrobial agent elution rate is well defined and can be controlled by controlling the coating thickness, coverage area, and antimicrobial agent concentration. In this example, the eluted chlorhexidine diacetate concentration within a Luer device is plotted as a function of the coating thickness (unit: mil or 0.001 inch), coating height (unit: inch), and chlorhexidine diacetate concentration (unit: % weight/weight). The Luer device had a cylindrical internal volume that was 1 inch high and had an internal volume of 0.12 ml in the range of internal volumes of many needleless connectors. The eluted CHA concentration is for devices after 7 days of pre-conditioning. Since the minimum inhibitory concentration for *Staphylococcus epidermidis* is 2 µg/ml, the coating formulation and coverage area can be easily designed to maintain adequate efficacy over an extended usage time. The results of these tests are shown in FIG. 2.

Example 3

Phase separation time comparison of fine CHA versus coarse CHA without a rheology modifier was conducted. Two antimicrobial coating suspensions were prepared; 100 mL of each suspension in graduated cylinders were monitoried for phase separation. Each suspension contained 10% (w/w) CHA in an acrylate-based UV curable coating solution. A control suspension sample was provided comprising 10% by weight coarse CHA with a mean particle size of 17 µm. A test suspension sample was also provided comprising 10% by weight fine CHA (Medichem, Spain) with a mean particle size of 6 µm. Mean particle sizes were determined from a particle size distribution measured via an image-based particle counter.

Figure 3:
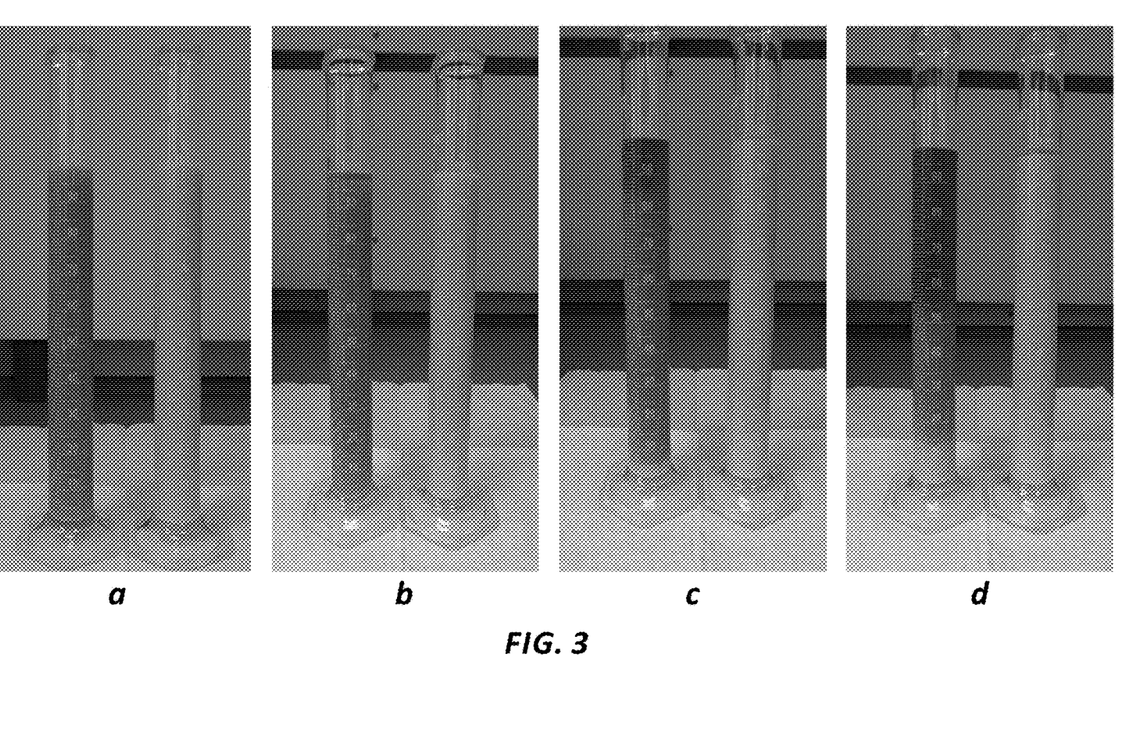
FIG. 3 shows various images demonstrating phase separation of a control suspension and a test suspension prepared with coarse and fine CHA, respectively, in accordance with a representative embodiment of the present invention.
Figure 4:
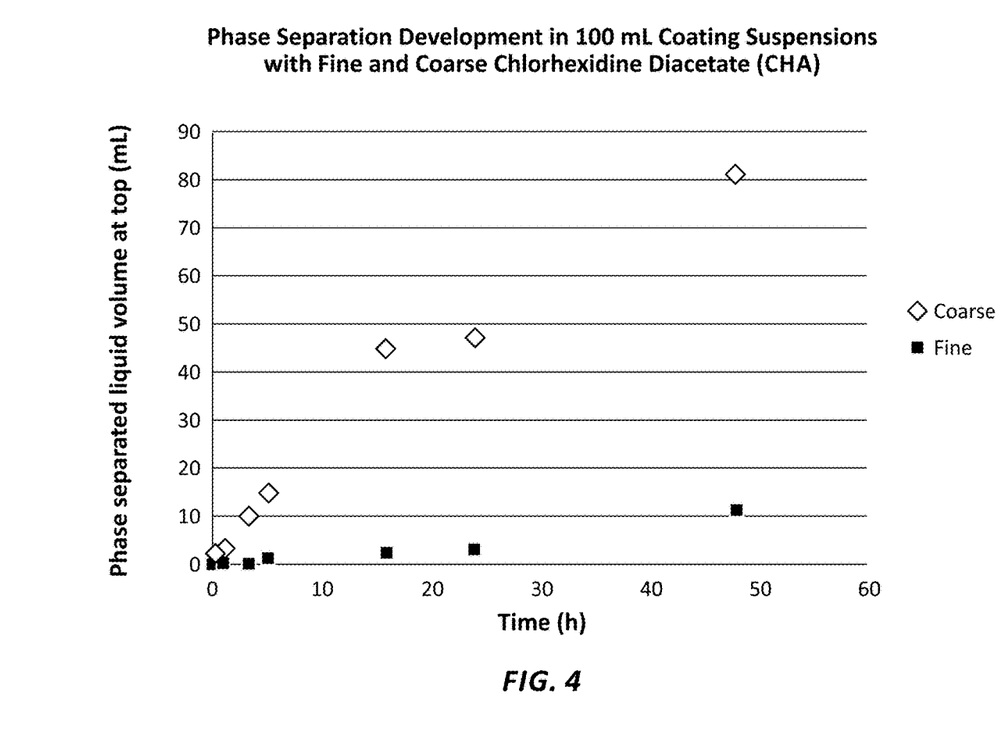
FIG. 4 shows a graph quantifying the phase separation of the control suspension and the test suspension provided in FIG. 3 in accordance with a representative embodiment of the present invention.

The suspensions were incubated at room temperature and images of the suspensions were taken at (a) t=0 minutes (immediately after mixing), (b) t=20 minutes, (c) t=5 hours, and (d) t=16 hours. Phase separation was observed in the control suspension at t=20 minutes, while phase separation was delayed and undetected in the test suspension until t=16 hours. Accordingly, the test suspension showed a 48-fold increase in suspension stability over the control suspension. Thus, reduction of the particle size substantially delayed phase separation in the antimicrobial coating test suspension. Images taken during this experiment are shown in FIG. 3. Also, as gravitational forces caused the solid CHA to sink and phase separate from the liquid UV coating, the appearance of liquid-only phase at the top of the graduated cylinders was quantified and graphed versus time. The results of this experiment are shown in FIG. 4.

It is underscored that the present invention may be embodied in other specific forms without departing from its spirit or essential characteristics. The described embodiments herein should be deemed only as illustrative.

The invention claimed is:

1. An antimicrobial; ultraviolet (UV) curable spray comprising:
   an adhesive comprising an oligomer, a monomer, and a photoinitiator; and
   an insoluble non-metallic antimicrobial agent comprising a plurality of particles, each of the particles having a particle size less than 10 µm;
   wherein the antimicrobial, ultraviolet (UV) curable spray does not comprise a rheology modifier, wherein a concentration of the antimicrobial agent is less than 8.9 parts by weight in 100 parts by weight of the coating, wherein the antimicrobial spray has a viscosity from approximately 5 centipose to approximately 500 centipose.

2. The antimicrobial UV curable spray of claim 1, wherein the insoluble antimicrobial agent is selected from a group consisting of chlorhexidine compounds, a polymer-bound antimicrobial peptide, alkylpyridinium iodide, sorbic acid, alexidine dihydrochloride, octenidine dihydrochloride, rifampicin, triclosan, and combinations thereof.

3. The antimicrobial UV curable spray of claim 1, wherein the insoluble antimicrobial agent is chlorhexidine diacetate.

4. The antimicrobial UV curable spray of claim 1, wherein the oligomer is selected from the group consisting of acrylated aliphatic urethanes, acrylated aromatic urethanes, acrylated polyesters, unsaturated polyesters, acrylated polyethers, and acrylated acrylics.

5. The antimicrobial UV curable spray of claim 4, wherein the acrylated functional group is selected from the group consisting of mono-functional, di-functional, tri-functional, tetra-functional, penta-functional, and hexa-functional acrylates.

6. The antimicrobial UV curable spray of claim 1, wherein the monomer is selected from the group consisting of 2-ethyl hexyl acrylate, isooctyl acrylate, isobornylacrylate, 1,6-hexanediol diacrylate, diethylene glycol diacrylate, triethylene glycol diacrylate, pentaerythritol tetra acrylate, penta erythritol tri acrylate, dimethoxy phenyl acetophenone hexyl methyl acrylate, and 1,6 hexanidiol methacrylate.

7. The antimicrobial UV curable spray of claim 1, wherein the photoinitiator is selected from the group consisting of benzoin ethers, acetophenones, benzoyl oximes, acyl phosphine oxide, and Michler's ketone, thioxanthone, anthroguionone, benzophenone, methyl diethanol amine, and 2-N-butoxyethyl-4-(dimethylamino) benzoate.

8. The antimicrobial UV curable spray of claim 1 wherein the insoluble antimicrobial agent is selected from the group consisting of aldehydes, anilides, biguanides, bis-phenols, and quaternary ammonium compounds.

9. A UV curable coating composition comprising:
a) an adhesive, comprising:
an oligomer;
a monomer; and
a photoinitiator;
b) an insoluble antimicrobial agent comprising a plurality of particles, each of the particles having a particle size less than about 15 μm, and provided in a concentration from less than approximately 8.9 parts by weight in 100 parts UV curable coating composition;
wherein the UV curable coating comprises a viscosity from approximately 5 centipoise to approximately 500 centipoise, wherein the UV curable coating composition does not comprise a rheology modifier.

10. The UV curable coating composition of claim 9, wherein the particle size is less than 10 μm.

11. A method of facilitating gradual release of an antimicrobial agent from an antimicrobial, ultraviolet (UV) curable coating on a surface of a medical device, comprising:
providing an antimicrobial, UV curable coating composition, wherein the antimicrobial, UV curable coating composition comprises:
an adhesive comprising an oligomer, a monomer, and a photoinitiator; and
an insoluble non-metallic antimicrobial agent comprising a plurality of particles, each of the particles having a particle size less than 15 μm, wherein a concentration of the insoluble non-metallic antimicrobial agent is less than 8.9 parts by weight in 100 parts by weight of the coating,
wherein the antimicrobial, UV curable coating composition does not comprise a rheology modifier and has a viscosity from approximately 5 centipose to approximately 500 centipose; and
spraying the UV curable coating composition on the surface of the medical device.

* * * * *